Feb. 20, 1968  J. C. HATCHER  3,369,849
ROLLING COULTER STABILIZER MOUNTING ARRANGEMENT
Filed March 29, 1966
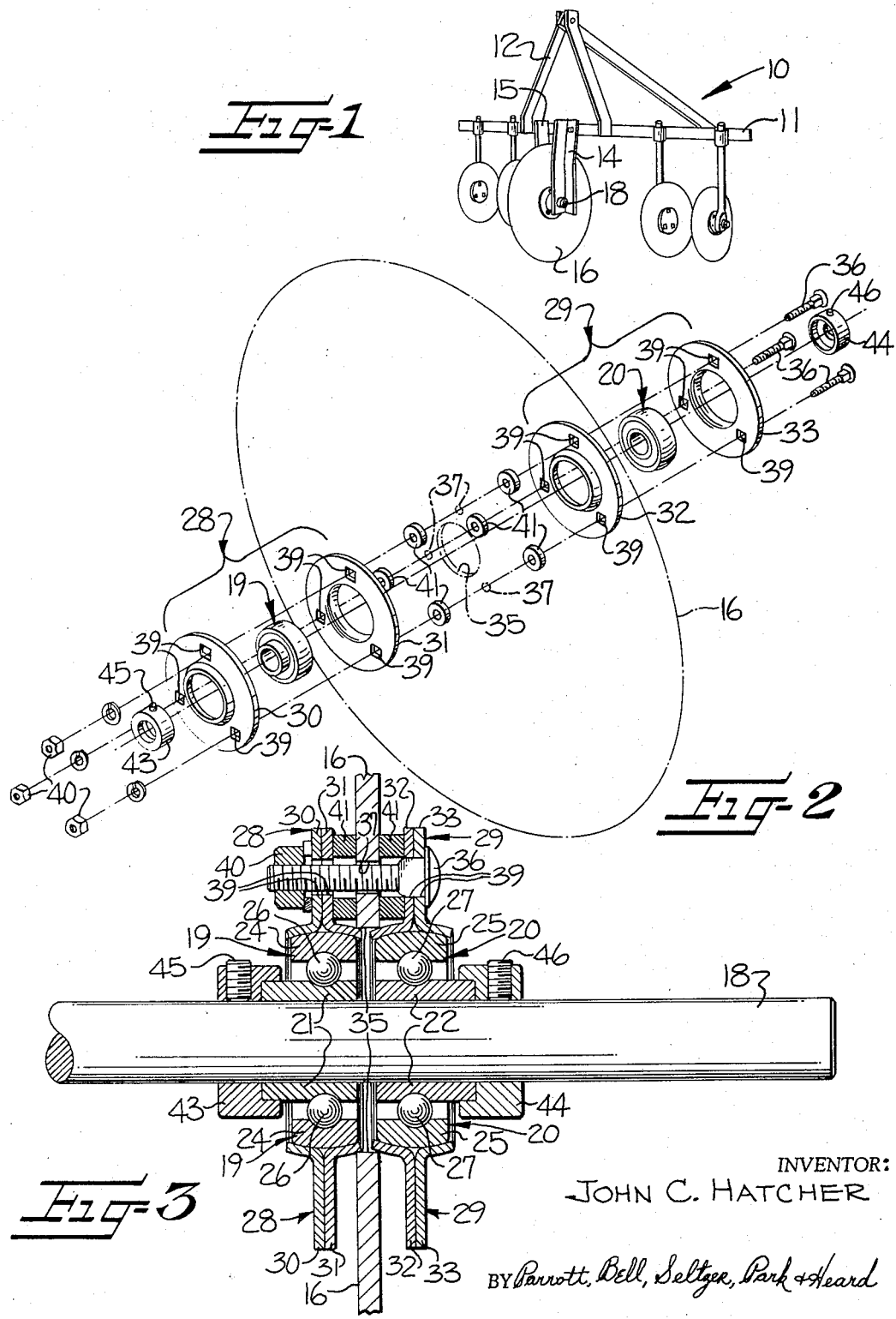
INVENTOR:
JOHN C. HATCHER
BY Parrott, Bell, Seltzer, Park & Heard
ATTORNEYS

United States Patent Office 3,369,849
Patented Feb. 20, 1968

3,369,849
ROLLING COULTER STABILIZER
MOUNTING ARRANGEMENT
John C. Hatcher, Charlotte, N.C., assignor to Cole Manufacturing Company, Charlotte, N.C., a corporation of North Carolina
Filed Mar. 29, 1966, Ser. No. 538,268
3 Claims. (Cl. 308—181)

ABSTRACT OF THE DISCLOSURE

A rolling coulter stabilizer mounting arrangement wherein first and second bearings including spherical segment surfaces are spaced along a shaft defining an axis of rotation and corresponding first and second pairs of flange members including spherical surfaces are secured in mating engagement with the spherical surfaces of the bearings, to facilitate positioning perpendicular to the axis defined by the shaft of a coulter disc secured between the pairs of flange members.

My invention relates to a rolling coulter stabilizer mounting arrangement for an agricultural implement and, more particularly, to an arrangement which facilitates positioning of a coulter disc perpendicular to an axis about which the disc revolves.

A rolling coulter stabilizer is used with certain agricultural implements in order to assure movement of the implement in a straight line behind a towing device such as a tractor. Such a rolling coulter stabilizer typically is a relatively large planar disc member, rigidly supported from the frame of the implement with which it is used and mounted for rotation about a horizontal axis. The lower portion of the disc is in rolling contact with the ground across which the implement is traversed and the rigid support of the disc from the implement frame permits the disc to resist lateral forces occurring during tilling operations which otherwise would turn the implement from a straight path and cause the implement to follow an erratic and sinuous or wavy path.

Inasmuch as the function of a rolling coulter stabilizer is to guide the implement to which it is connected in straight line movement, it is of primary importance that the disc of the stabilizer be supported truly perpendicular to the axis about which it rotates. Any inclination of the disc with respect to the axis about which it rotates will result in the implement being guided along a sinuous or curvy path.

It is the primary object of this invention to provide a mounting arrangement for a rolling coulter stabilizer disc in which placement of the disc perpendicular to the axis about which it rotates is facilitated.

A more specific object of this invention is to provide a mounting arrangement of the type described wherein a rolling coulter stabilizer disc is supported from first and second bearing means spaced along a shaft by means of engagement with bearing flange means in encircling engagement with the bearings, with the engagement of the disc with the flange means and the flange means with the bearing means cooperating to place the coulter disc perpendicular to the shaft axis.

Some of the objects and advantages of my invention having been stated, others will appear as the description proceeds, when taken in connection with the accompanying drawings, in which:

FIGURE 1 is a perspective view of an agricultural implement incorporating the rolling coulter mounting arrangement of this invention;

FIGURE 2 is an exploded perspective view of certain elements of the mounting arrangement of this invention; and FIGURE 3 is an elevation view, in partial section, through the mounting arrangement of this invention.

Referring now more particularly to the drawing, a representative agricultural implement, generally indicated at 10, is shown in FIGURE 1 by way of illustration of the manner in which a rolling coulter stabilizer is mounted for use. While such a stabilizer is adaptable to a wide variety of implements, the implement 10 may be considered illustrative of a fertilizer distributor having a frame 11 and being provided with a suitable hitching means 12 for attachment to a towing device such as a tractor. Adjacent the forward or leading end of the frame 11 are provided depending legs 14, 15 which support a rolling coulter disc 16 for purposes as described heretofore.

This invention is particularly concerned with the mounting arrangement for the rolling coulter disc 16, which is shown in detail in FIGURES 2 and 3. There, it may be seen that the mounting arrangement includes a shaft 18 defining an axis of rotation, which shaft is horizontally mounted by being suitably fixed in the depending legs 14 and 15 of the frame 11 of the agricultural implement 10 (FIGURE 1). First and second bearing means, respectively indicated generally at 19 and 20, are mounted on the shaft 18 at predetermined positions therealong. Preferably, each of the bearing means 19, 20 is an antifriction bearing of the self-aligning type, having an inner race (21 and 22, respectively), an outer race (24 and 25, respectively), and rolling elements (26 and 27, respectively) interposed between the races. As has been known in self-aligning antifriction bearings, the exterior surfaces of the outer race members 24, 25 are spherical segment surfaces. That is, the exterior surface of each of the outer race members is a portion of the surface of a sphere having its center at the center point of the bearing structure. The particular purpose of the spherical segment exterior surface will be brought out in greater detail hereinafter.

First and second bearing flange means are mounted on respective ones of the bearings 19, 20, and are indicated generally at 28 and 29, respectively. Each of the bearing flange means 28, 29 has a radially projecting portion and spherical segment interior and exterior surfaces. Preferably, each of the bearing flange means 28, 29 comprises a pair of flange members 30, 31 and 32, 33 respectively, which together define the projecting portion and the interior and exterior surfaces. More particularly, each flange member 30, 31, 32, 33 has a generally planar annular radially projecting portion and a cupped portion including the spherical segment surfaces. The spherical segment interior surfaces of the bearing flange means 28, 29 have a spherical radius corresponding to that of the spherical segment exterior surfaces of the bearings 19, 20, and mate with or are in encircling engagement with the respective bearings. It is because of the encircling engagement of the interior spherical segment surface of the bearing flange means 28, 29 with the exterior spherical segment surface of the bearings 19, 20 that the flange means 28, 29 each comprise a pair of flange members, this construction being required to permit assembly of the flange means about the bearing means. By virtue of the mating of the spherical segment surfaces, the projecting portions of the bearing flange means 28, 29 may be disposed at varying intersecting angles with respect to the axis of rotation defined by the shaft 18, without impairing the freedom of rotation necessary for the mounting arrangement of this invention.

The coulter disc 16 has a central opening 35 therein, and is positioned between the projecting portions of the bearing flange means 28, 29. The relative dimensions of the central opening 35 in the coulter disc 16 and the exterior spherical segment surfaces of the bearing flange means 28, 29 are such that the disc 16, when positioned as shown in FIGURE 3, is in encircling engagement with a portion of each of the flange means 28, 29, and is in contact with the spherical segment exterior surface thereof.

In order to secure together the elements of the mounting arrangement of this invention, for rotation about the axis defined by the shaft 18, and in order to bring about the cooperation of the elements of the mounting arrangement so that the disc 16 is positioned perpendicular to the axis, means are provided which include a plurality of fastener means extending parallel to the shaft, penetrating the disc 16 and engaging the projecting portions of the bearing flange means 28, 29 at circumferential locations thereabout, for securing together the flange means and the disc. Preferably, the fastener means takes the form of a plurality of bolts 36, which penetrate the disc 16 through fastener openings 37 spaced radially outwardly from the central opening 35 and circumferentially thereabout. The bolts 36 also penetrate fastener openings 39 provided in each of the flange members of the bearing flange means 28, 29, and the bolts 36 are secured with the elements of the mounting arrangement in assembled condition by suitable nuts 40. Interposed between the disc 16 and the projecting portions of the bearing flange means 28, 29 are spacer elements 41, chosen with regard to the spacing apart of the bearings 19, 20 to have a size which positions the projecting portions of the bearing flange means 28, 29 substantially parallel to the disc 16 while providing a tension pre-load for the bolts 36. Preferably, the disc 16 is positioned medially of the spaced apart bearings 19, 20 to permit the encircling engagement of the disc with the exterior spherical segment surfaces of the bearing flange means 28, 29.

Upon assembly of the elements of the mounting arrangement of this invention, with the disc 16 in encircling engagement with the spherical segment exterior surfaces of the bearing flange means 28, 29, and with the spherical segment interior surfaces of the bearing flange means 28, 29 mating with the spherical segment exterior surfaces of the bearings 19, 20, the securing together of the elements of the arrangement by the fastener means cooperates with the encircling engagements of the spherical surfaces to position the disc 16 perpendicular to the axis of rotation defined by the shaft 18. The manner in which this cooperation results in the placement of the disc 16 perpendicular to the shaft 18 results from the limitations imposed upon the possible positions of the disc 16 by the cooperation of the spherical surfaces and by the positioning of the fastener means parallel to the shaft 18. Inasmuch as the fastener means are parallel with the shaft 18, the aligned positions of the projecting portions of the bearing flange means 28, 29 as separated by the disc 16 and the spacing elements 41 must be not only substantially parallel to each other but perpendicular to the axis defined by the shaft 18. Additionally, the encircling engagement of the central opening 35 of the disc 16 with the exterior spherical segment surfaces of the bearing flange means 28, 29 locates that disc 16 for rotation about a center which lies on a straight line connecting the two centers of the exterior spherical segment surfaces of the bearing means 19, 20, and half way between those centers. Placement of the disc 16 perpendicular to the axis defined by the shaft 18 is thus not only facilitated by the mounting arrangement of this invention, but is required by the physical limitations placed on the possible positions for the disc 16.

Upon assembly of the elements of the mounting arrangement of this invention, as described heretofore, retaining rings 43, 44 may be positioned on the shaft 18 to engage the inner races 21, 22 of the bearing means 19, 20, and locked into position by suitable set screws 45, 46.

In use, the rolling coulter stabilizer disc 16, positioned perpendicular to the axis of the shaft 18 by virtue of the mounting arrangement of this invention, guides an implement such as the implement 10 for straight line movement, and restrains the implement against sinuous or wavy travel. Lateral forces acting on the implement 10, and tending to cause sideway and sinuous movement of the implement, may be resolved as an overturning movement or overturning force acting on the rolling coulter stabilizer disc 16. Through the particular mounting arrangement of this invention, such an overturning force is readily accommodated, without displacing the disc 16 from the perpendicular position which is required for satisfactory operation of the implement.

It is believed apparent that a mounting arrangement for a rolling coulter stabilizer for an agricultural implement has been described with reference to drawings in which particular advantages are obtained by facilitating the placement of the coulter disc perpendicular to an axis about which the same revolves through the cooperation of spherical segment surfaces.

In the drawing and specification, there has been set forth a preferred embodiment of the invention, and although specific terms are employed, they are used in a generic and descriptive sense only and not for purposes of limitation, the scope of the invention being defined in the claims.

I claim:
1. A rolling coulter stabilizer mounting arrangement for an agricultural implement, said mounting facilitating the positioning of a coulter disc perpendicular to an axis about which the same revolves and comprising:
   a shaft defining an axis of rotation,
   first and second bearing means mounted on said shaft at predetermined positions therealong, each of said bearing means having a spherical segment exterior surface,
   first and second pairs of bearing flange members mounted on respective ones of said bearing means, each of said flange members having a radially projecting portion and a cupped portion including a spherical segment interior surface mating with said exterior surface of said respective bearing means,
   a coulter disc having a central opening therein and being positioned between said radially projecting portions of said first and second flange members, and
   means including a plurality of fastener means extending parallel to said shaft and penetrating said disc and engaging said projecting portions at circumferential locations thereabout for securing together said flange members with said disc positioned between said first and second pairs of flange members for rotation together about said axis, said last-named means cooperating with said spherical surfaces to position said disc perpendicular to said axis.

2. A mounting as claimed in claim 1 further comprising a plurality of spacer means interposed between said disc and said radially projecting portions adjacent the locations of said fastener means, said spacer means positioning and maintaining said disc and said projecting portions substantially parallel.

3. A mounting as claimed in claim 2 wherein said bearing means are spaced apart a predetermined distance on said shaft and said disc is positioned medially of said bearing means.

References Cited

UNITED STATES PATENTS 2,712,966  4/1955  Brady et al. _____ 308—181

FOREIGN PATENTS 638,632  4/1962  Italy.

MARTIN P. SCHWADRON, *Primary Examiner.*

FRANK SUSKO, *Examiner.*